(No Model.)
C. HARTLEY.
LID FOR FRYING OR OTHER PANS.
No. 444,702. Patented Jan. 13, 1891.
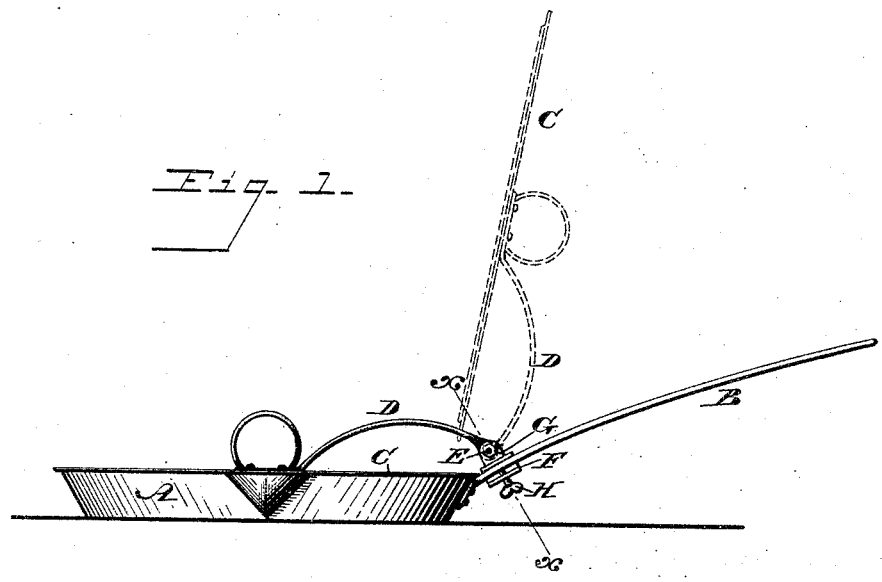
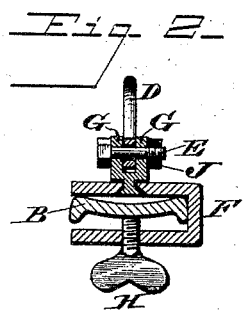
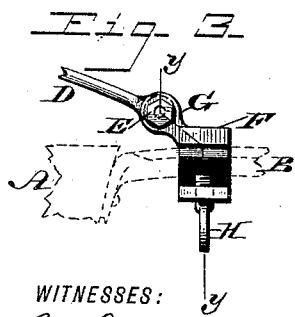
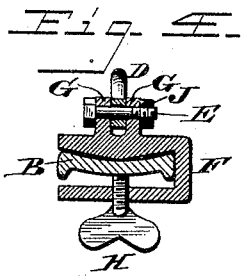
WITNESSES:
L. Douville,
Robt. Aston.
INVENTOR
Caroline Hartley
BY John A. Wiedersheim
ATTORNEY.

UNITED STATES PATENT OFFICE.

CAROLINE HARTLEY, OF PHILADELPHIA, PENNSYLVANIA.

LID FOR FRYING OR OTHER PANS.

SPECIFICATION forming part of Letters Patent No. 444,702, dated January 13, 1891.

Application filed September 4, 1890. Serial No. 363,889. (No model.)

*To all whom it may concern:*

Be it known that I, CAROLINE HARTLEY, a citizen of the United States, residing in the city and county of Philadelphia, State of Pennsylvania, have invented a new and useful Improvement in Lids for Frying or other Pans, which improvement is fully set forth in the following specification and accompanying drawings.

My invention consists of a lid for frying or other pans which is detachably connected with the handle thereof and adapted to be raised or lowered and swung laterally, as desired.

Figure 1 represents a side elevation of a frying-pan with lid embodying my invention connected therewith. Fig. 2 represents a section thereof, on an enlarged scale, on line $x\,x$, Fig. 1. Fig. 3 represents a side elevation of another form of the clamp for securing the lid to the handle of the pan. Fig. 4 represents a section thereof on line $y\,y$, Fig. 3.

Similar letters of reference indicate corresponding parts in the several figures.

Referring to the drawings, A designates a frying-pan, and B the handle thereof, each being of any well-known form of construction.

C designates a lid or cover, to which is secured one end of an arm D, the latter, which is preferably of curved form, being pivoted at its other end by a bolt E to a clamp F. The said clamp F is provided with ears G, in which the bolt E is secured, and which are swiveled to one limb of the said clamp, as shown in Figs. 1 and 2, while in the form shown in Figs. 3 and 4 the ears are fixed to the clamp. In the latter figures the upper limb has a tongue on its under side to conform to the convexity of the upper side of the handle, so that when the screw H, which passes through the lower limb of the clamp and bears against the handle, is operated the upper limb of the clamp bears uniformly upon the said handle and interlocks therewith.

To hold the bolt E in place in the ears G, a nut J is placed on the screw-threaded end thereof.

It will be seen that owing to the pivotal connections of the arm D with the clamp by means of the bolt E the lid can be swung upward, as shown in dotted lines, Fig. 1; or it may by the swiveled connection of the ears G with the clamp F be moved laterally, so as to be removed from over the pan and to one side thereof. The lid as thus connected can be readily removed from the handle of the pan, so that the latter can be used without the said lid, and the pan and lid thus detached can be more conveniently packed, if desired, for carriage.

Having thus described my invention, what I claim as new, and desire to secure by Letters Patent, is—

1. A pan having a handle and lid with a projecting arm and a clamp removably attached to the said handle, said arm of the lid being pivoted to said clamp, substantially as described.

2. A pan with a handle, a lid with an arm, and a clamp having a swiveled bracket or portion to a bolt in which said arm is pivoted, said parts being combined substantially as described.

3. A pan with a handle, a lid with an arm, and a clamp having ears swiveled to a limb thereof and provided with a bolt to which said arm is pivoted, said parts being combined substantially as described.

4. A pan with a handle, a lid with an arm, and a clamp having ears swiveled to a limb thereof, said arm being pivotally connected with said ears and the upper limb of the clamp conforming to the face of the handle, said parts being combined substantially as described.

CAROLINE HARTLEY.

Witnesses:
JOHN A. WIEDERSHEIM,
A. P. JENNINGS.